United States Patent [19]
Morris et al.

[11] 3,968,065
[45] July 6, 1976

[54] VULCANIZABLE POLYMER BLENDS OF A HALOGEN-CONTAINING POLYMER AND A CARBOXYL-CONTAINING POLYMER

[75] Inventors: Roger E. Morris, Cuyahoga Falls; Richard H. Backderf, Richfield, both of Ohio

[73] Assignee: The B. F. Goodrich Company, Akron, Ohio

[22] Filed: Dec. 30, 1974

[21] Appl. No.: 537,062

[52] U.S. Cl. .................. 260/23.5 R; 260/23.7 H; 260/23.7 M; 260/42.34; 260/874; 260/890; 260/899; 260/901
[51] Int. Cl.² ........................................ C08L 33/02
[58] Field of Search ........ 260/901, 899, 890, 42.34, 260/874, 23.5 R, 23.7 H, 23.7 M

[56] References Cited
UNITED STATES PATENTS

| | | | |
|---|---|---|---|
| 3,326,832 | 6/1967 | Rauschenbach et al. | 260/28.5 |
| 3,639,298 | 2/1972 | Lister et al. | 260/2.5 FP |
| 3,700,650 | 10/1972 | Hani et al. | 260/79 |
| 3,770,602 | 11/1973 | Alelio | 260/901 |

*Primary Examiner*—Carman J. Seccuro
*Attorney, Agent, or Firm*—Alan A. Csontos

[57] ABSTRACT

Polymer blends of a halogen-containing polymer and a carboxyl-containing polymer are covulcanized using as the cure system (1) a metal oxy compound and (2) a quaternary ammonium salt or a monofunctional tertiary amine. The vulcanizates exhibit excellent physical properties, and are useful in fabricating hose, belting, gaskets, o-rings, and the like.

22 Claims, No Drawings

VULCANIZABLE POLYMER BLENDS OF A HALOGEN-CONTAINING POLYMER AND A CARBOXYL-CONTAINING POLYMER

BACKGROUND OF THE INVENTION

Polymers having halogen cure sites are well known. Examples of these are polychloroprene rubbers, the epihalohydrin elastomers, the chlorine cure site acrylate rubbers, and bromobutyl rubbers. These polymers react with curing agents at the halogen cure site to yield vulcanized elastomers of established utility. Art on curing of halogen-containing polymers relevant to the present invention is as follows: U.S. Pat. Nos. 2,600,414; 3,488,331; 3,686,156; 3,732,174; and 3,732,190. Polymers having carboxyl cure sites are also well known. Examples of such are the carboxyl cure site acrylate rubbers and the polyacrylic acids. These polymers react with curing agents at the carboxyl cure site to yield useful vulcanizates. Art on curing carboxyl-containing polymers relevant to the present invention is as follows: U.S. Pat. Nos. 2,604,668; 2,649,439; 2,669,550; 2,724,707; 2,726,230; and 3,404,134.

The two types of polymers can be physically admixed to provide polymer blends. However, the polymer blends have limited utility unless a satisfactory method of co-curing the polymers in the blend is devised. The most beneficial and efficient method is to use a cure system that promotes co-curing of the polymers.

SUMMARY OF THE INVENTION

Polymer blends of halogen-containing polymers and carboxyl-containing polymers are efficiently cured using a novel cure system which promotes co-cure of the polymers. The cure system consists essentially of (1) a metal oxy compound and (2) a quaternary ammonium salt or a monofunctional tertiary amine. Co-vulcanized polymer blends having excellent physical properties are obtained.

DETAILED DESCRIPTION OF THE INVENTION

Polymer blends of halogen-containing polymers and carboxyl-containing polymers do not lend themselves to efficient co-vulcanization. The two types of cure sites are either unresponsive to or highly selective toward a single cure system. This results in a polymer blend having over-cured and under-cured portions, and poor (if any) co-cure of the polymer types. The compositions of the present invention contain a cure system that promotes co-cure of the polymers in the blend.

The compositions of the invention comprise (A) a halogen-containing polymer, (B) a carboxyl-containing polymer, and (C) a cure system consisting essentially of (1) a metal oxy compound and (2) a quaternary ammonium salt or a monofunctional tertiary amine. The polymer blend comprises a mixture of (A) and (B). The halogen-containing polymer is present in the polymer blend in from about 1 part to about 99 parts by weight, and, more preferredly, from about 5 parts to about 95 parts by weight based upon 100 parts by weight of the polymer blend. The carboxyl-containing polymer is likewise present in the blend in from about 1 part to about 99 parts by weight, and, more preferredly, from about 5 parts to about 95 parts by weight based upon 100 parts by weight total in the polymer blend. The metal oxy compound is used in from about 0.5 part to about 20 parts by weight, and, more preferredly, from about 1 part to about 7 parts by weight per 100 parts by weight of the polymer blend. The quaternary ammonium salt or monofunctional tertiary amine is used in from about 0.1 part to about 10 parts by weight, and, more preferredly, in from about 0.3 part to about 5 parts by weight per 100 parts by weight of the polymer blend.

Halogen-Containing Polymer

The halogen-containing polymers are of two main types: those obtained by the polymerization of halogen-bearing monomers and those obtained by halogenating preexisting polymers. Either type of halogen-containing elastomer has a range of from about 0.1 to about 60% by weight of halogen based on the weight of the polymer. Such a range of halogen content can be exemplified by a copolymer of 99.5% by weight of ethyl acrylate and 0.5% by weight of 5-chloroacetoxymethyl-2-norbornene (the low range), and a polyepibromohydrin polymer (the high range). More typically, the halogen-containing elastomeric polymer will have from about 0.2 to about 40% by weight of halogen, exemplified by a copolymer of 99% by weight of ethyl acrylate and 1% by weight of vinyl chloroacetate or 2-chloroethyl acrylate (the low range) and polychloroprene rubber or an epichlorohydrin polymer (the high range). As shown, the halogen content of the polymer can vary over a wide range.

The halogen is selected from chlorine, bromine, or iodine. More preferredly, the halogen is chlorine or bromine, and typically, due to cost and availability, the halogen-containing polymer has chlorine groups.

The halogen-containing polymers can be (co)polymers of halogen-bearing monomers or they can be halogenated elastomeric polymers (or a polymer containing halogen obtained by both methods).

The larger of the types of halogen-containing polymers are those obtained by polymerization of halogen-bearing monomers. These polymers can contain from about 0.2 by weight to 100% by weight (i.e., homopolymers) of interpolymerized units of a halogen-bearing monomer and up to 99.8% by weight of a copolymerizable, non-halogen-containing vinylidene monomer.

Examples of halogen-bearing monomers are halogen-bearing vinylidene hydrocarbons such as vinyl benzyl chloride, vinyl benzyl bromide, 5-chloromethyl-2-norbornene, 5-bromomethyl-2-norbornene, 5-$\beta$-chloroethyl-2-norbornene, and the like; and chloroprene, bromoprene, 2-$\beta$-chloroisopropyl butadiene, and the like; and halogen-bearing vinylidene hydrocarbons containing oxy linkages such as halogen-bearing vinyl esters such as vinyl chloroacetate, vinyl bromoacetate, allyl chloroacetate, vinyl 4-chlorobutyrate, vinyl 4-bromobutyrate, and the like; halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like; halogen-containing vinyl ethers such as 2-chloroethyl vinyl ether; halogen-containing vinyl ketones such as chloromethyl vinyl ketone, 2-chloroethyl vinyl ketone, and the like; and 5-chloroacetoxymethyl-2-norbornene, 5-($\alpha,\beta$-dichloropropionylmethyl)-2-norbornene, and the like. Examples of the more preferred halogen-bearing vinylidene monomers are vinyl chloroacetate, allyl chloroacetate, 2-chloroethyl acrylate, 3-chloropropyl acrylate, 4-chloro-2-butenyl acrylate and methacrylate, 2-chloroethyl methacrylate, chloromethyl vinyl ketone, vinyl benzyl chloride, chloroprene, 5-chloromethyl-2-norbornene, 2-chloroacetoxyethyl acrylate and methacrylate, and 5-chloroacetoxymethyl-2-norbornene.

These halogen-bearing vinylidene monomers are often copolymerized with one or more non-halogen-containing vinyl monomers containing a terminal vinylidene ($CH_2=C<$) group. These monomers, used in up to 99.8% by weight, are acrylates and methacrylates, such as ethyl acrylate, n-butyl acrylate, octyl acrylate, dodecyl acrylate, methyl methacrylate, phenyl acrylate, cyclohexyl acrylate, and the like; vinyl and allyl esters such as vinyl acetate, vinyl propionate, vinyl butyrate, allyl acetate, and the like; vinyl ketones such as methyl vinyl ketone, propyl vinyl ketone, and the like; vinyl and allyl ethers such as vinyl methylether, vinyl ethylether, vinyl isobutylether, allyl methylether, and the like; vinyl aromatics such as styrene, α-methylstyrene, vinyl toluene, vinyl naphthalene, and the like; vinyl nitriles such as acrylonitrile, methacrylonitrile, and the like; dienes such as butadiene, isoprene, 2-isopropyl-1,3-butadiene, and the like; α-monoolefins such as ethylene, propylene, 1-butene, 1-hexene, and the like; divinyls such as divinyl benzene, divinyl ether, diethylene glycol diacrylate, and the like; vinyl amides such as acrylamide, methacrylamide, N-methyl methacrylamide, diacetone acrylamide, and the like; hydroxyl-containing vinyl monomers such as allyl alcohol, β-hydroxyethyl acrylate, α-hydroxypropyl acrylate, 4-hydroxybutyl acrylate, β-hydroxyethyl methacrylate; and the like.

One of the most preferred copolymerizable vinylidene monomers to be used with the halogen-bearing monomers is the acrylate monomer. The acrylate has the formula

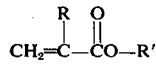

wherein R is H, $-CH_3$, or $-C_2H_5$, and R' is an alkyl radical containing 1 to about 24 carbon atoms, or an alkoxyalkyl or alkylthioalkyl radical containing a total of 2 to about 12 carbon atoms in the radical. The alkyl structure can be linear or branched. Examples of the acrylates are methyl acrylate, ethyl acrylate, n-propyl acrylate, isopropyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-tetradecyl acrylate, n-octadecyl acrylate, n-eicosyl acrylate, and the like; methyl methacrylate, ethyl methacrylate, n-hexyl methacrylate, n-octyl methacrylate, n-dodecyl methacrylate, n-octadecyl methacrylate, ethyl ethacrylate, n-butyl ethacrylate, and the like; and methoxyethyl acrylate, ethoxyethyl acrylate, butoxyethyl acrylate, ethoxypropyl acrylate, methoxyethyl methacrylate, methylthioethyl acrylate, hexylthioethyl acrylate, and the like. Often mixtures of two or more types of acrylate monomers are employed.

More preferredly, R' is an alkyl radical containing 1 to about 18 carbon atoms or an alkoxyalkyl radical containing 3 to about 8 carbon atoms. Examples of the more preferred monomers are ethyl acrylate, n-propyl acrylate, isopropyl acrylate, n-butyl acrylate, n-pentyl acrylate, isoamyl acrylate, n-hexyl acrylate, n-octyl acrylate, 2-ethylhexyl acrylate, n-decyl acrylate, n-dodecyl acrylate, n-octadecyl acrylate, methoxyethyl acrylate, ethoxyethyl acrylate, methoxypropyl acrylate, ethoxypropyl acrylate, and the like. Both an alkyl acrylate and an alkoxyalkyl acrylate can be used. Especially good results are obtained when employing ethyl acrylate, n-butyl acrylate, 2-ethylhexyl acrylate or methoxyethyl acrylate, or mixtures of the same.

Examples of the halogen containing polymers obtained from polymerization of halogen-bearing vinylidene monomers are poly(ethyl acrylate/2-chloroethyl vinyl ether), poly(ethyl acrylate/vinyl chloroacetate), poly(ethyl acrylate/butyl acrylate/2-chloroethyl acrylate), poly(butyl acrylate/methoxy ethyl acrylate/5-chloromethyl-2-norbornene), poly(ethyl acrylate/vinyl benzyl chloride), poly(ethyl acrylate/2-ethylhexyl acrylate/5-chloroacetoxymethyl-2-norbornene), poly(ethyl acrylate/chloroprene), polychloroprene, poly(butadiene/chloroprene), and the like.

Another type of halogen-bearing monomer is the epihalohydrin monomer used to prepare epihalohydrin polymers. The polyepihalohydrin polymer can be an epihalohydrin homopolymer, a copolymer of two or more epihalohydrin monomers, or a copolymer of an epihalohydrin monomer(s) with an oxide monomer(s). Copolymers of epihalohydrin monomers and oxide monomers typically comprise about 50 to 100% by weight (i.e., homopolymers of polymerized units of epihalohydrin monomer(s), and up to 50% by weight of polymerized units of an oxide monomer(s).

The epihalohydrin monomers have the formula

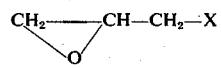

where X is Cl, Br, or I. More preferredly, X is selected from Cl and Br. From a cost and availability standpoint, the preferred monomer is epichlorohydrin. Other halogen-bearing epoxide monomers can be used in partial replacement of the epihalohydrin monomer(s). Examples of these monomers are 4-chloro-1, 2-epoxy butane, 4-bromo-1,2-epoxy butane, 1-bromoethyl glycidyl ether, and the like.

The oxide comonomers contain a cyclic oxy

ring therein. Examples of these monomers are alkylene oxides such as ethylene oxide, propylene oxide, butylene oxide, isobutylene oxide, octylene oxide, and the like; cycloaliphatic oxides such as cyclohexene oxide, vinyl cyclohexene oxide, and the like; glycidyl ethers such as methyl glycidyl ether, ethyl glycidyl ether, isopropyl glycidyl ether, n-hexyl glycidyl ether, phenyl glycidyl ether, and the like; glycidyl acrylate and glycidyl methacrylate; allyl glycidyl ether; styrene oxide; and 4- and 5-membered oxy ring compounds such as furan and methyl substituted furan, and the like. Of the oxide comonomers, the alkylene oxides containing 2 to about 8 carbon atoms are preferred. Copolymers of epihalohydrin monomer(s) and alkylene oxide monomer(s) are readily available.

Examples of the more preferred polyepihalohydrin polymers are polyepichlorohydrin, polyepibromohydrin, poly(epichlorohydrin/epibromohydrin), poly(epichlorohydrin/ethylene oxide), poly(epibromohydrin/ethylene oxide), poly-(epichlorohydrin/propylene oxide), poly(epichlorohydrin/ethylene oxide/allyl glycidyl ether), and poly(epichlorohydrin/ethylene oxide/propylene oxide).

A second broad type of halogen-containing polymers are those polymers which have been halogenated via a chemical reaction. Although almost any polymer can be halogenated using techniques known to the art (for example, halogenated resins such as brominated phenol-formaldehyde resins can be utilized), the polymers most often halogenated are polymers such as poly-α-olefins like polyethylene, polypropylene, polybutylene, and copolymers thereof. Examples of halogenated elastomeric polymers are chlorinated poly(isobutylene/isoprene) rubber (i.e., chlorobutyl rubber), brominated butyl rubber, brominated poly(ethylene/propylene/diene) rubber (i.e., brominated EPDM rubber), and chlorosulfonated polyethylene polymers (Hypalon rubbers).

Carboxyl-Containing Polymers

The carboxyl-containing polymers employed are of three main types; i.e. those obtained by the polymerization of carboxyl-containing monomers, those obtained by hydrolyzing a polymer containing groups hydrolyzable to carboxyl groups, and those polymers containing carboxyl groups obtained by both methods. The range of weight percent carboxyl (COOH) content in these polymers is from about 0.05 to about 63% by weight (the high range exemplified by polyacrylic acid homopolymer).

The largest of the types of carboxyl-containing polymers are those obtained by polymerization of carboxyl-containing monomers. The polymers contain from about 0.1 to 100% by weight (i.e., homopolymers) of interpolymerized units of a carboxyl-containing monomer and up to 99.9% by weight of interpolymerized units of non-carboxyl-containing copolymerizable vinyidene monomer. The carboxyl-containing monomer used to prepare the polymers can be any such monomer than can be polymerized. Normally, the carboxyl-containing monomer is a monomer having olefinic unsaturation and capable of being polymerized via a free-radical process. Of these, the $\alpha,\beta$-olefinically unsaturated carboxyl-containing monomers are most used. The monomer can be mono-, di-, or polycarboxylic, and can contain from 3 to about 8 carbon atoms in the molecule. Examples of the carboxyl-containing monomers are acrylic acid, methacrylic acid, ethacrylic acid, $\beta,\beta$-dimethyl acrylic acid, crotonic acid, 2-methyl-2-butenoic acid, 2-pentenoic acid, 2-hexenoic acid, 3-ethyl-2-pentenoic acid, 2-heptenoic acid, maleic acid, fumaric acid, citraconic acid, mesaconic acid, itaconic acid, 3-butene-1,2,3-tricarboxylic acid, 2-norbornene-5-carboxylic acid, and the like. The more preferred monomers are acrylic acid, methacrylic acid, maleic acid, fumaric acid, and itaconic acid.

The carboxyl-containing monomers are often copolymerized with one or more noncarboxyl-containing vinyl monomers having a terminal vinylidene ($CH_2=C\langle$) group. These monomers, used in up to 99.9% by weight, are acrylates and methacrylates, such as ethyl acrylate, n-butyl acrylate, octyl acrylate, dodecyl acrylate, methyl methacrylate, phenyl acrylate, cyclohexyl acrylate, and the like; vinyl and allyl esters such as vinyl acetate, vinyl propionate, vinyl butyrate, allyl acetate, and the like; vinyl ketones such as methyl vinyl ketone, propyl vinyl ketone, and the like; vinyl and allyl ethers such as vinyl methyl ether, vinyl ethyl ether, vinyl isobutyl ether, allyl methyl ether, and the like; vinyl aromatics such as styrene, α-methyl styrene, vinyl toluene, vinyl naphthalene, and the like; dienes such as butadiene, isoprene, 2-isopropyl-1,3-butadiene, and the like; α-monoolefins such as ethylene, propylene, 1-butene, 1-hexene, and the like; divinyls such as divinyl benzene, divinyl ether, diethylene glycol diacrylate, and the like; hydroxyl containing vinyl monomers such as allyl alcohol, β-hydroxyethyl acrylate, α-hydroxypropyl acrylate, 4-hydroxybutyl acrylate, β-hydroxyethyl methacrylate; and the like. Often mixtures of two or more types of monomers are employed.

One of the most preferred copolymerizable vinylidene monomers to be used with the carboxyl-containing monomers is an acrylate monomer of the formula

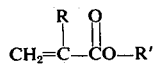

wherein R and R' are defined as above. Often mixtures of two or more types of acrylate monomers are employed. More preferredly, R' is an alkyl radical containing 1 to about 18 carbon atoms or an alkoxyalkyl radical containing 3 to about 8 carbon atoms. Examples of the more preferred monomers are ethyl acrylate, n-propyl acrylate, isopropyl acrylate, n-butyl acrylate, n-pentyl acrylate, isoamyl acrylate, n-hexyl acrylate, n-octyl acrylate, 2-ethylhexyl acrylate, n-decyl acrylate, n-dodecyl acrylate, n-octadecyl acrylate, methoxyethyl acrylate, ethoxyethyl acrylate, methoxypropyl acrylate, ethoxypropyl acrylate, and the like. Both an alkyl acrylate and an alkoxyalkyl acrylate can be used. Especially good results are obtained when employing ethyl acrylate, n-butyl acrylate, 2-ethylhexyl acrylate, methoxyethyl acrylate, or mixtures of the same.

Examples of the carboxyl-containing polymers of the first type; i.e. those obtained by polymerizing carboxyl-containing monomers, are polyacrylic acid, polymethacrylic acid, poly(ethyl acrylate/acrylic acid), poly(ethyl acrylate/itaconic acid), poly(ethyl acrylate/n-butyl acrylate/acrylic or methacrylic acid), poly(ethyl acrylate/methoxyethyl acrylate/acrylic or methacrylic acid), poly(ethyl acrylate/n-butyl acrylate/methoxyethyl acrylate/methacrylic acid), poly(ethyl acrylate/citraconic acid), poly(n-butyl acrylate/maleic acid), poly(n-butyl acrylate/styrene/methacrylic acid, poly(ethyl acrylate/methoxyethyl acrylate/ethyl vinyl ether/acrylic or methacrylic acid), poly(butadiene/acrylic or methacrylic acid), poly(isoprene/fumaric acid), poly(butadiene/styrene/acrylic or methacrylic acid), poly(ethylene/acrylic acid), and the like.

The second type of carboxyl-containing polymers are those obtained by hydrolyzing a polymer containing groups hydrolyzable to carboxyl groups. Groups hydrolyzable to carboxyl groups include acid anhydrides, amides, nitrile, acid chlorides, and β-cyanoalkyl groups. Polymers can be prepared containing the above-mentioned hydrolyzable groups by interpolymerization of monomers having these groups, alone or with other copolymerizable monomers as described above. Examples of hydrolyzable monomers are maleic anhydride, citraconic anhydride, 2-norbornene-5,6-anhydride, and the like; acrylamide, methacrylamide, and the like; acrylonitrile, methacrylonitrile, and the like; acrylyl chloride, methacrylyl chloride, and the like; and β-cyanoethyl acrylate, β-cyanoethyl methacrylate, β-cyanopropyl acrylate, and the like. U.S. Pat. No. 2,649,439 discloses procedures and techniques on hydrolysis of these groups.

The hydrolyzable monomers can be polymerized alone (i.e., homopolymers), with each other as copolymers, or with other copolymerizable monomers. Hence, the interpolymerized unit weight of such hydrolyzable monomers in the polymer can be from 100% by weight to as low as 0.1 by weight, with up to 99.9% by weight of interpolymerized units of a copolymerizable vinyl monomer containing a terminal vinylidene group. The potential carboxyl content of these polymers is the same as the carboxyl content of the carboxyl-containing polymers; i.e., from about 0.05 to about 63% by weight of the polymer.

Examples of polymers containing hydrolyzable groups are polyacrylamide, polymethacrylamide, polyacrylonitrile, poly(ethyl acrylate/acrylamide or methacrylamide), poly(ethyl acrylate/n-butyl acrylate/acrylamide or methacrylamide), poly(ethyl acrylate/maleic anhydride), poly(ethyl acrylate/$\beta$-cyanoethyl acrylate), poly(ethyl acrylate/n-butyl acrylate/acrylonitrile or methacrylonitrile), poly(ethyl acrylate/acrylyl chloride), poly(butadiene/acrylamide or methacrylamide), poly(isoprene/maleic anhydride), poly(butadiene/acrylonitrile or methacrylonitrile), poly(butadiene/styrene/acrylonitrile), poly(ethylene/maleic or citraconic anhydride), and the like.

As a third type of useful polymer, the polymer can contain carboxyl groups from both interpolymerization of carboxyl-containing monomers and hydrolysis of hydrolyzable monomers. Of course, if the polymer already contains carboxyl groups (for example, as by interpolymerization of carboxyl-containing monomers), the hydrolyzable groups need not be hydrolyzed to carboxyl groups.

Examples of polymer having both carboxyl groups and hydrolyzable groups are poly(n-butyl acrylate/acrylonitrile/acrylic or methacrylic acid), poly(ethyl acrylate/n-butyl acrylate/maleic anhydride/methacrylic acid), poly(n-butyl acrylate/acrylic acid/acrylamide or methacrylamide), poly(ethyl acrylate/itaconic acid/$\beta$-cyanoethyl acrylate), poly(n-butyl acrylate/ethyl vinyl ether/acrylonitrile/methacrylic acid), poly(butadiene/acrylonitrile/acrylic or methacrylic acid), poly(butadiene/fumaric acid/acrylamide), and the like.

The halogen-containing and carboxyl-containing polymers can be prepared using emulsion, suspension, solution or bulk polymerization techniques well known to those skilled in the art. The polymerization can be performed as a batch reaction, or one or more ingredients can be proportioned during the run.

The polymerizations are normally continued until high conversion of monomers to polymer is achieved. The polymers can be isolated by coagulation, freeze agglomeration, filtration, evaporating off solvent and unreacted monomer, or by other well known techniques, or the polymers can be maintained in latex, suspension, or solution form and physically blended in those forms. The polymers can be liquid, semisolid, or solid in nature (at ambient temperature). Molecular weights of the polymers can vary from about 1000 to over 1,000,000 or more. Polymer blends of two types of liquid polymers, a liquid and a solid polymer, and two types of solid polymers are encompassed by the invention. Excellent results have been obtained by co-curing polymer blends of a solid carboxyl-containing polymer and a liquid halogen containing polymer, and vice versa.

Polymer blends of more than one type of halogen-containing polymer mixed with one or more types of carboxyl-containing polymer are encompassed in the scope of the invention.

CURE SYSTEM

The cure system consists essentially of (1) a metal oxy compound and (2) a quaternary ammonium salt or a monofunctional tertiary amine. The metal oxy compound is selected from the group consisting of (a) the metal salt of an organic acid and (b) a non-alkali metal oxide, hydroxide, or carbonate.

METAL SALTS OF ORGANIC ACIDS

The metals in the metal salts of organic acids include the alkali metals such as sodium, potassium, and the like, or non-alkali metals which includes alkaline earth metals such as barium and magnesium, and polyvalent metals such as lead, zinc, copper, and cadmium. The organic acids include carboxylic acids, organophosphoric acids, and organosulfonic acids.

The carboxylic acid is a monocarboxylic acid containing from 2 to about 24 carbon atoms. The acids may be unsaturated, and can contain hydroxy, ether, ester or ketonic groups. Examples of such acids are acetic acid, propionic acid, valeric acid, caproic acid, octanoic acid, 2-ethyl hexanoic acid, decanoic acid, lauric acid, palmitic acid, stearic acid, cyclohexane carboxylic acid, crotonic acid, cinnamic acid, hydroxy acetic acid, acetoacetic acid, butoxy acetic acid, levulinic acid, mono-2-octyl maleate, benzoic acid, toluic acid, salicyclic acid, naphthenic acid, and the like. Preferredly the metal salt is a salt of an aliphatic or of an aromatic monocarboxylic acid containing 6 to about 20 carbon atoms in the molecule.

Examples of metal salts of carboxylic acids are sodium octanoate, potassium 2-ethyl hexanoate, sodium t-dodecanoate, sodium and potassium tetradodecanoate, sodium and potassium stearate, sodium eicosonate, sodium benzoate, potassium naphthenate, and the like; barium dihexanoate, magnesium dilaurate, barium distearate, and the like; and lead dioctanoate, barium di(2-ethylhexanoate), cadmium di(decanoate), lead dilaurate, zinc and cadmium distearate, zinc and magnesium dibenzoate, cupric naphthenate, and the like.

The metal salts of organo-phosphoric acids also may be used. These compounds are characterized by the structure

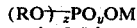
$(RO)_y\!-\!PO_zOM$ wherein M is an alkali metal, $y = 1$ or 2, $z = 1$ or 2, and $y + z = 3$, and R is an alkyl radical containing 1 to 24 carbon atoms, an aryl radical containing 6 to 24 carbon atoms, or a polyether as the condensation product of an organic acid or alcohol with ethylene oxide, such as alkyl phenoxy poly(ethyleneoxy) ethyl groups. Examples of these compounds are sodium salt of monophenyl phosphate, sodium salt of mono-p-tert-butyl phenyl phosphate, potassium salt of di-o-xenyl phosphate, sodium salt of mono-lauryl phosphate, sodium salt of dioctyl phosphate, potassium salt of distearyl phosphate, potassium salt of mono-dodecyl-monobenzoyl phosphate, and sodium and potassium salts of mono- and dialkylphenoxy poly(ethylenoxy) ethyl phosphates, and the like. More preferredly, M is sodium or potassium, and R, when an alkyl radical, contains about 8 to about 18 carbon atoms, and, when an aryl radical, contains 6 to about 14 carbon atoms.

The alkali metal salts of organosulfonic acids are characterized by the structure

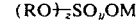
$(RO)_y\!-\!SO_zOM$ wherein R, M, y and z are described as above. Examples of organosulfonic acid metal salts are sodium lauryl sulfonate, sodium alkylnaphthalene sulfonate, sodium and potassium salt of dodecylbenzene sulfonic acid, and the like.

NON-ALKALI METAL OXIDES, HYDROXIDES, AND CARBONATES

The non-alkali metal oxides, hydroxides, and carbonates contain multivalent barium (Ba), lead (Pb), calcium (Ca), magnesium (Mg), zinc (Zn), copper (Cu), aluminium (Al), and cadmium (Cd). The more preferred non-alkali metal oxy compounds are the oxides and hydroxides of barium, lead, calcium, and magnesium. Examples of these compounds are barium oxide, barium hydroxide, barium carbonate, lead monoxide, lead dioxide, red lead oxide, lead sesquioxide, lead hydroxide, lead carbonate, calcium oxide, calcium hydroxide, calcium carbonate, magnesium oxide, magnesium hydroxide, magnesium carbonate, cupric oxide, cupric hydroxide, cupric carbonate, cadmium oxide, and cadmium hydroxide.

QUATERNARY AMMONIUM SALT

The quaternary ammonium salts are ammonium salts in which all four hydrogen atoms have been replaced with organic radicals. The quaternary ammonium salts include the structure

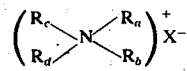

wherein $R_a$, $R_b$, $R_c$ and $R_d$ are hydrocarbon radicals containing 1 to about 18 carbon atoms such as alkyl, aryl, alkaryl and aralkyl radicals, or wherein two or three of the $R_a$, $R_b$, $R_c$ and $R_d$ radicals form with the nitrogen atom a heterocyclic structure containing 3 to 8 atoms selected from the group consisting of C, N, O and S, where at least two atoms are C; and X is an anion from an inorganic or organic acid wherein the acidic hydrogen is attached to halogen or oxygen. More preferredly, X is a anion such as $Cl^-$, $Br^-$, $I^-$, $OH^-$, $NO_3^-$, $HSO_4^-$, $NaSO_4^-$, $H_2PO_4^-$, $NaHPO_4^-$, $RCOO^-$, $ROSO_3^-$, $RSO^{3-}$, $H_2BO_3^-$, and $ROPO_3H^-$, and R is an aliphatic, alkyl or alkaryl radical containing 1 to 18 carbon atoms. The aliphatic radical can contain ether, thioether, and/or ester structures. For example, it can be the reaction product of an organic acid or alcohol with ethylene oxide, such as alkylphenoxy poly(ethyleneoxy) ethyl structures.

Examples of the quaternary ammonium salts are tetramethyl ammonium chloride, tetramethyl ammonium bromide, trimethyl ethyl ammonium iodide, trimethyl soya ammonium chloride, trimethyl cetyl ammonium bromide, trimethyl soya ammonium neodecanoate, trimethyl soya ammonium trimethylhexanoate, trimethyl benzyl ammonium benzoate, trimethyl benzyl ammonium chloride, trimethyl benzyl ammonium paratoluene sulfonate, trimethyl soya ammonium alkylbenzene sulfonate, dimethyl ethyl cetyl ammonium chloride, dimethyl octyl benzyl ammonium chloride, dimethyl oleyl benzyl ammonium chloride, dimethyl octadecyl benzyl ammonium chloride, dimethyl phenyl benzyl ammonium bromide, dimethyl dibenzyl ammonium bromide, methyl ethyl propyl isobutyl ammonium chloride, (tetradecyl)trimethyl ammonium chloride, methyl cetyl dibenzyl ammonium bromide, cetyl pyridinium chloride, dodecyl pyridinium bromide, lauryl pyridinium sulfate, trimethyl benzyl ammonium borate, trimethyl benzyl ammonium hydrogen phosphate, trimethyl soya ammonium alkylphenoxy poly(ethyleneoxy) ethyl phosphate, and the like. The term "soya" is a common name for the aliphatic hydrocarbon mixture obtained from soya bean oil. The mix is 10% by weight hexadecyl, 10% octadecyl, 35% octadecenyl, and 45% by weight octadecadienyl.

MONOFUNCTIONAL TERTIARY AMINES

The monofunctional tertiary amines can be used in their natural form or as amine precursors or as amine/acid salts. The amine precursors and amine/acid salts are added at levels which yield the desired levels of amine catalyst. For example, if the amine form forty percent by weight of the compound, and 1 part by weight of the amine is desired, 2.5 parts by weight of the compound would be added to the polymer blends.

The monofunctional tertiary amines can be aliphatic amines, cyclic methyleneamines, or heterocyclic amines. Examples of such amines are trimethyl amine, triethyl amine, dimethyl butyl amine, dimethylbenzyl amine, methyl dibenzyl amine, dimethyl ethanol amine, methyl diethanol amine, N-methyl piperidine, N-methyl morpholine, quinuclidine, pyridine, 3-ethyl-4-methl pyridine, 3-phenylpropylpyridine, and the like. The more preferred tertiary amines are the cyclic methyleneamines and heterocyclic amines containing 4 to 8 atoms in the ring, and the tertiary aliphatic amines containing 1 to about 18 carbon atoms in the aliphatic groups, provided that at least one aliphatic group is a methyl or ethyl radical.

The tertiary amines can be employed as amine/acid adducts. In this form, increased scorch safety can be obtained. The acids can be inorganic or organic acids. Examples of the acids are hydrochloric acid, phosphoric acid, lauryl sulfonic acid, benzene sulfonic acid, paratoluene sulfonic acid, alkylbenzene sulfonic acids, aromatic carboxylic acids such as benzoic acid, and aliphatic carboxylic acids such as acetic acid, propionic acid, butyric acid, hexanoic acid, 2-ethylhexanoic acid, dodecanoic acid, octadecanoic acid, naphthenic acid, and the like. When used in the amine/acid form, the strong tertiary aliphatic amines such as trimethylamine and triethylamine can be conveniently employed. Examples of tertiary amine/acid adducts are trimethylamine/hydrochloric acid adduct, trimethylamine/phosphoric acid adduct, trimethylamine/sodium hydrogen sulfate adduct, trimethylamine/benzoic acid adduct, triethylamine/butyric acid adduct, triethylamine/dodecanoic acid adduct, triethylamine/benzene sulfonic acid adduct, N-methyl piperidine/lauryl sulfonic acid adduct, N-methyl piperidine/benzoic acid adduct, N-methyl piperidine/2-ethylhexanoic acid adduct, quinuclidine/hydrochloric acid adduct, 3-phenylpropylpyridine benzoic acid adduct, and the like. If an amine/acid adduct is used, an acid absorber should be present in sufficient quantity to neutralize the released acid.

Tertiary amine precursors such as aminimides can also be employed. Aminimides break down at vulcanization temperatures to release a tertiary amine. Used in the compositions of this invention, the aminimides allow for greater scorch safety and yet a fast cure. Examples of these compounds are bis(trimethylamine) sebacimide, bis-(dimethyl-2-hydroxypropylamine)

adipimide, dimethyl-2-hydroxpropylamine laurimide, and dimethyl-2-hydroxypropylamine stearimide.

The halogen-containing polymer(s) and carboxyl-containing polymer(s) can be admixed with each other and with the cure system using mixing kettles when the polymers are in latex or solution form, and, when the polymers are isolated liquid or solid polymers, banbury mixers, extruders, two-roll mills, Henschel mixers, and other well known mixing machines are used. Standard mixing procedures and techniques are employed, the only qualification being that the best results are obtained when uniform mixing of polymers, curatives, and rubber compounding ingredients is achieved.

The compositions of the invention; i.e., the polymer blend and cure system, can be admixed with many types of rubber compounding ingredients. Examples of such ingredients are fillers and reinforcing agents, pigments, plasticizers and extenders, antioxidants and stabilizers, tackifiers, flame retardants, fungicides, and the like (see Materials and Compounding Ingredients for Rubber, Bill Communications, Inc., N.Y., N.Y., 1970 Edition).

The novel compositions are cured at temperatures from about 250°F. to about 450°F., whereas a more preferred range is from about 275°F. to about 400°F. Cure time varies inversely as temperature, and ranges from about 1 minute to about 60 minutes or more. The polymers can be post-cured for about 3 to 24 hours at a temperature from about 300°F. to about 375°F.

The novel compositions develop rapid and stable cures. The vulcanizates were evaluated as to their plied disk compression set (ASTM D395V), tensile and elongation (ASTM D412), and hardness (ASTM D676-durometer A). Cure times were determined following ASTM D1646, using a Mooney viscometer with a large rotor, or using a Monsanto Rheometer or a B.F.G. Cone Curometer as described in U.S. Pat. No. 3,494,172.

The vulcanizates are useful in many applications where weatherability, high temperature serviceability, and oil resistance are required. Such applications are under-the-hood automotive parts such as gaskets, seals, packings, belting and hosing, and out-of-doors applications such as weatherstripping, sealants, and hosing.

The following examples serve to more fully illustrate the invention. The materials used in the examples are given in parts by weight unless otherwise indicated.

EXAMPLES

Polymer blends of solid halogen-containing polymers with solid or liquid carboxyl-containing polymers, and of liquid halogen-containing polymers with solid carboxyl-containing polymers, were prepared. The polymers employed are either commercially available polymers or are readily prepared using processes and techniques known to the art. The normal mixing procedure, when isolated liquid or solid polymers were employed, comprised adding the polymers to an internal mixer such as a banbury, followed by rubber compounding ingredients such as carbon black and oil (if used). The polymers were mixed for about 5 minutes following standard procedures. Curatives were added during the mixing cycle or were added to the polymer blend as it was banded on a two-roll mill. Samples of the compositions were press-cured and in some instances post-cured to provide specimens for physical property evaluation. The novel compositions cocure to yield vulcanizates having good physical properties representative of both types of polymers used.

EXAMPLE I

A series of polymer blends of carboxyl-containing acrylate polymers with halogen-containing polyether polymers was prepared and the blends cured using an alkali metal salt of a carboxylic acid and a quaternary ammonium salt as the curatives. The acrylate polymers were comprised of interpolymerized units of ethyl acrylate, n-butyl acrylate, and/or methoxyethyl acrylate with methacrylic acid. The polyether polymers were epichlorohydrin homopolymers and epichlorohydrin-/ethylene oxide copolymers.

The polymers are identified as follows: Carboxyl Polymer A, 99.2% by weight ethyl acrylate, 0.8% by weight methacrylic acid; Carboxyl Polymer B, 75% by weight n-butyl acrylate, 24.2% by weight ethyl acrylate, 0.8% by weight methacrylic acid; Carboxyl Polymer C, 52% n-butyl acrylate, 47.2% methoxyethyl acrylate, 0.8% methacrylic acid; Halogen Polymer A, 100% by weight epichlorohydrin, Mooney viscosity of about 60 (ML-4 at 212°F.); and Halogen Polymer B, 70% epichlorohydrin, 30% ethylene oxide, Mooney of about 100 (ML-4 at 212°F.).

Recipes, cure conditions, and vulcanizate property data are given in the following table. The data demonstrates co-cure of the polymers at various blend ratios of one polymer to the other.

EXAMPLE II

Polymer blends of a carboxyl-containing acrylate polymer (Carboxyl Polymer A of Example I) and a

TABLE

|  | 1 | 2 | 3 | 4 | 5 | 6 | 7 | 8 | 9 | 10 |
|---|---|---|---|---|---|---|---|---|---|---|
| Carboxyl Polymer A | — | — | — | 50 | 70 | 40 | 50 | 70 | 80 | 40 |
| Carboxyl Polymer B | 50 | — | — | — | — | — | — | — | — | — |
| Carboxyl Polymer C | — | 50 | 70 | — | — | — | — | — | — | — |
| Halogen Polymer A | 50 | 50 | — | — | — | — | 50 | 30 | 20 | 60 |
| Halogen Polymer B | — | — | 30 | 50 | 30 | 60 | — | — | — | — |
| N550 Black | 42 | 42 | 50 | 48 | 56 | 44 | 48 | 54 | 61 | 44 |
| N881 Black | 10 | 10 | 14 | — | — | — | — | — | — | — |
| Acrawax C[1] | 1 | 1 | 2 | 1 | 0.6 | 1.2 | — | — | — | — |
| NBC[2] | 0.5 | 0.5 | — | — | — | — | — | — | — | — |
| Potassium Stearate | 1.0 | 1.0 | 1.5 | — | — | — | — | — | — | — |
| Sodium Stearate | 1.5 | 1.5 | 1.0 | 2.5 | 2.5 | 2.5 | 3.0 | 3.0 | 3.0 | 3.0 |
| Trimethyl Soya[3] Ammonium Chloride[4] | 2.4 | 2.4 | 3.0 | 2.4 | 2.4 | 2.4 | 2.4 | 2.4 | 2.4 | 2.4 |
| Cure Time, Minutes | 10 | 15 | 25 | 40 | 40 | 40 | 40 | 40 | 40 | 40 |
| Cure Temperature, °F. | 338 | 338 | 338 | 310 | 310 | 310 | 310 | 310 | 310 | 310 |
| Tensile, psi | 1350 | 1300 | 1280 | 1160 | 1570 | 960 | 1900 | 1700 | 1720 | 1800 |
| Elongation, percent | 280 | 180 | 180 | 380 | 380 | 380 | 280 | 190 | 190 | 300 |
| Hardness, Durometer A | 58 | 62 | 60 | 59 | 65 | 55 | 64 | 71 | 73 | 65 |
| Post-Cure Time, Hours | 20 | 20 | 20 | 8 | 8 | 8 | 20 | 20 | 20 | 20 |
| Temperature, °F. | 300 | 300 | 300 | 300 | 300 | 300 | 300 | 300 | 300 | 300 |
| Tensile, psi | 1210 | 1250 | 800 | 1100 | 1550 | 800 | 1950 | 1900 | 2000 | 1890 |
| Elongation, percent | 160 | 120 | 100 | 200 | 190 | 210 | 200 | 140 | 120 | 260 |

TABLE-continued

|  | 1 | 2 | 3 | 4 | 5 | 6 | 7 | 8 | 9 | 10 |
|---|---|---|---|---|---|---|---|---|---|---|
| Hardness, Durometer A | 65 | 69 | 70 | 65 | 73 | 60 | 69 | 78 | 80 | 66 |
| Compression Set (70 hrs. at 300°F.) (Plied Disks) | | | | | | | | | | |
| Press Cure | 46 | 43 | 59 | 58 | 70 | 63 | 37 | 43 | 51 | 37 |
| Post Cure | 36 | 33 | 40 | 54 | 47 | 61 | 37 | 31 | 27 | 42 |
| Volume Swell in ASTM No. 3 oil (3 days at 300°F.) | 30 | 18 | 20 | 14 | 13 | 15 | — | — | — | — |

[1] Processing aid
[2] Nickel dibutyldithiocarbamate
[3] Mixture of $C_{16}$–$C_{18}$ hydrocarbons from soya bean oil
[4] 50% by weight on precipitated silica halogen-containing polymer were prepared and cured.

[1] The halogen-containing polymers are Halogen Polymer C, a polymer of 50% by weight of n-butyl acrylate, 25% methoxyethyl acrylate, 23.6% ethyl acrylate, and 1.4% by weight of vinyl benzyl chloride; and Halogen Polymer D, a polychloroprene homopolymer having a Mooney Viscosity of about 50 (ML-10 at 212°F.). Recipes and cure data follow.

|  | 1 | 2 | 3 | 4 | 5 |
|---|---|---|---|---|---|
| Carboxyl Polymer A | 50 | 50 | 30 | 50 | 60 |
| Halogen Polymer C | 50 | 50 | 70 | — | — |
| Halogen Polymer D | — | — | — | 50 | 40 |
| N550 Black | 63 | 63 | 62 | 58 | 60 |
| N881 Black | 10 | 10 | 14 | — | — |
| Sodium Stearate | 3.0 | 3.0 | 3.5 | 3.5 | 3.5 |
| Trimethyl Soya Ammonium Chloride | 1.0 | — | — | 1.0 | 1.0 |
| Trimethylamine-Hydrochloride | — | — | 0.5 | — | — |
| Bis(trimethylamine)sebacimide | — | 1.0 | — | — | — |
| Cured 40 Minutes | | | | | |
| Temperature, °F. | 310 | 310 | 310 | 340 | 340 |
| Tensile, psi | 600 | 580 | 1030 | 1730 | 1730 |
| Elongation, percent | 380 | 340 | 280 | 160 | 180 |
| Hardness, Durometer A | 64 | 66 | 60 | 75 | 73 |
| Post-Cured 20 hours at 300°F. | | | | | |
| Tensile, psi | 1250 | 1220 | 1250 | — | — |
| Elongation, percent | 250 | 240 | 240 | — | — |
| Hardness, Durometer A | 71 | 73 | 64 | — | — |

EXAMPLE III

Following the procedures of Examples I and II, polymer blends of solid carboxyl-containing and solid halogen-containing polymers were prepared and cured. Carboxyl Polymer D, 62% by weight butadiene, 32% acrylonitrile, 6% by weight of methacrylic acid, having a raw polymer Mooney Viscosity of about 45 (ML-4 at 212°F.), was employed. Recipes and cure data are given in the following table.

|  | | | | | | | | | |
|---|---|---|---|---|---|---|---|---|---|
| Carboxyl Polymer D | 70 | 50 | 30 | 50 | 50 | 50 | 70 | 33 | 25 |
| Carboxyl Polymer A | — | — | — | — | — | — | — | — | 25 |
| Halogen Polymer A | 30 | 50 | 70 | 50 | — | 50 | 30 | 67 | 50 |
| Halogen Polymer B | — | — | — | — | 50 | — | — | — | — |
| N550 Black | 36 | 35 | 34 | 35 | 35 | 35 | 36 | 40 | 41 |
| TE-80[1] | 0.3 | 0.5 | 0.7 | — | — | 0.5 | 0.3 | 1.4 | 0.5 |
| NBC | 0.3 | 0.5 | 0.7 | 0.5 | — | 0.5 | 0.3 | 0.1 | 0.5 |
| Stalite S[2] | 1.4 | 1.0 | 0.5 | 1.0 | 1.0 | 1.0 | 1.4 | 0.6 | 0.5 |
| ARRD[3] | 0.4 | 0.7 | 1.0 | 0.7 | 0.7 | 0.7 | 0.4 | — | 0.7 |
| Sodium Stearate | 2.8 | 2.8 | 2.8 | 2.4 | — | 3.5 | 3.5 | 2.1 | 2.8 |
| Potassium Stearate | — | — | — | — | 2.4 | — | — | — | — |
| Trimethyl Soya Ammonium Chloride | 3.0 | 3.0 | 3.0 | 3.0 | 3.0 | 3.0 | 3.0 | 2.4 | 3.0 |
| Press Cure at 338°F. | | | | | | | | | |
| Time, Minutes | 40 | 25 | 20 | 25 | 28 | 15 | 15 | 25 | 25 |
| Tensile, psi | 2380 | 1980 | 1800 | 1910 | 1860 | 1630 | 2060 | 2130 | 1830 |
| Elongation, percent | 500 | 330 | 340 | 350 | 430 | 240 | 290 | 300 | 350 |
| Hardness, Durometer A | 65 | 65 | 64 | 62 | 61 | 63 | 65 | 65 | 67 |
| Air Aged at 257°F. | | | | | | | | | |
| Time, days | 5 | 5 | 5 | 7 | 7 | 3 | 3 | 5 | 5 |
| Tensile, psi | 1700 | 1650 | 2180 | 1600 | 950 | 1780 | 1580 | 1450 | 1720 |
| Elongation, percent | 150 | 150 | 190 | 120 | 80 | 160 | 140 | 170 | 130 |
| Hardness, Durometer A | 73 | 71 | 68 | 70 | 73 | 67 | 69 | 72 | 75 |
| Press Cure Compression Set | | | | | | | | | |
| Percent (70 hours at 257°F.) | 44 | 30 | 31 | 37 | 43 | — | — | — | 30 |
| Percent Volume Swell (3 Days at 300°F. in ASTM No. 3) | 17 | 15 | 13 | 15 | 16 | — | — | — | 12 |

-continued

| | | | | | | | | | |
|---|---|---|---|---|---|---|---|---|---|
| Gehman Freeze, °C. | | −24 | −26 | −26 | −27 | −33 | — | — | — | −22 |

[1] Processing Aid
[2] Octylated Diphenylamine
[3] Polymerized 2,2,4-trimethyl dihydroquinoline In contrast to the polymer blends of the previous examples wherein a carboxyl-containing acrylate rubber was employed, in the present blends a carboxyl-containing diene rubber was used. Note that sample 9 is a terpolymer blend wherein both a carboxyl-containing diene and a carboxyl-containing acrylate rubber are blended with the halogen-containing polyether polymer. In all the samples, good co-cured vulcanizates were obtained.

chlorohydrin polymer having a molecular weight of about 19,000 and a chlorine content of about 37 percent by weight. The liquid halogen-containing polymer was added using standard banbury and mill mixing procedures. The liquid polymers comprised from about 5% to about 8% by weight of the total polymer blend. Recipes and cure data are given below. A variety of metal oxy compounds and quaternary ammonium salts were used as the curatives.

| | 1 | 2 | 3 | 4 | 5 | 6 | 7 | 8 | 9 | 10 | 11 | 12 | 13 |
|---|---|---|---|---|---|---|---|---|---|---|---|---|---|
| Carboxyl Polymer C | 100 | 100 | 100 | 100 | 100 | 100 | — | — | — | — | — | — | — |
| Carboxyl Polymer E | — | — | — | — | — | — | 100 | 100 | 100 | 100 | 100 | 100 | — |
| Carboxyl Polymer F | — | — | — | — | — | — | — | — | — | — | — | — | 100 |
| Halogen Polymer E | 8 | 8 | 8 | 8 | 8 | 8 | 7 | 5 | 8 | 8 | 7.5 | 7.5 | 7.5 |
| N550 Black | 65 | 65 | 65 | 65 | 65 | 65 | 65 | 65 | 65 | 65 | 65 | 65 | 65 |
| Acrawax C | 2 | 2 | 2 | 2 | 2 | 2 | 2 | 2 | 2 | 2 | 2 | 2 | 2 |
| Sodium Stearate | 2.0 | 1.5 | — | — | — | — | 4.5 | — | — | — | — | — | — |
| Potassium Stearate | — | — | 1.5 | — | — | 2.0 | — | — | — | 2.0 | 2.1 | 2.0 | 2.8 |
| Sodium Cinnamate | — | — | — | 1.0 | 0.7 | — | — | — | — | — | — | — | — |
| Potassium Neodecanoate | — | — | — | — | — | — | — | 1.0 | 1.0 | — | — | — | — |
| Trimethyl Soya Ammonium Neodecanoate | 2.0 | 2.5 | 2.0 | 2.0 | 2.5 | 2.0 | — | 2.0 | 2.0 | 2.0 | — | — | — |
| Cetyl Trimethyl Ammonium Bromide | — | — | — | — | — | — | 1.1 | — | — | — | — | — | — |
| Trimethyl Soya Ammonium Stearate | — | — | — | — | — | — | — | — | — | — | — | — | — |
| Trimethyl Soya Ammonium Chloride | — | — | — | — | — | — | — | — | — | — | 1.5 | 1.2 | — |
| Dodecyl Pyridinium Bromide | — | — | — | — | — | — | — | — | — | — | — | — | 0.75 |
| Press Cure | | | | | | | | | | | | | |
| Time, Minutes | 40 | 40 | 40 | 40 | 40 | 40 | 40 | 30 | 30 | 30 | 35 | 35 | 40 |
| Temperature, °F. | 320 | 320 | 320 | 320 | 320 | 320 | 310 | 320 | 320 | 320 | 320 | 320 | 350 |
| Tensile, psi | 1250 | 1100 | 1180 | 1240 | 1170 | 1180 | 1910 | 1600 | 1730 | 1610 | 980 | 610 | 610 |
| Elongation, percent | 170 | 130 | 160 | 180 | 140 | 160 | 440 | 360 | 310 | 340 | 800 | 980 | 530 |
| Hardness, Durometer A | 61 | 64 | 63 | 58 | 60 | 62 | 66 | 65 | 64 | 62 | 67 | 68 | 50 |
| Post Cure | | | | | | | | | | | | | |
| Time, hours | — | — | — | — | — | — | — | 20 | 20 | 20 | 20 | 20 | 8 |
| Temperature, °F. | — | — | — | — | — | — | — | 300 | 300 | 300 | 300 | 300 | 350 |
| Tensile, psi | — | — | — | — | — | — | — | 2050 | 2050 | 1600 | 1730 | 1980 | 850 |
| Elongation, percent | — | — | — | — | — | — | — | 190 | 180 | 170 | 280 | 310 | 400 |
| Hardness, Durometer A | — | — | — | — | — | — | — | 71 | 70 | 69 | 78 | 79 | 56 |
| Compression Set (70 hrs. at 300°F.) | | | | | | | | | | | | | |
| Press Cure (40 Min.) | 64 | 58 | 60 | 66 | 58 | 62 | 80 | 60 | 44 | 44 | 98 | 100 | 90 |
| Post Cure | — | — | — | — | — | — | — | 23 | 15 | 17 | 43 | 41 | 78 |

EXAMPLE IV

A series of polymer blends were prepared using solid carboxyl-containing polymers and a liquid halogen-containing polymer. The polymers used are identified as follows: Carboxyl Polymer C as used before; Carboxyl Polymer E, 99.3% by weight ethyl acrylate, 0.7% by weight methacrylic acid; Carboxyl Polymer F, 70% n-butyl acrylate, 29.6% ethyl acrylate, 0.4% methacrylic acid; and Halogen Polymer E, a polyepi-

EXAMPLE V

Polymer blends of solid carboxyl-containing acrylate rubbers and a liquid halogen-containing polyether were prepared, cured, and extensively tested. Carboxyl Polymer G is comprised of interpolymerized units of 16.6% by weight ethyl acrylate, 33.1% n-butyl acrylate, 49.7% methoxyethyl acrylate, and 0.6% methacrylic acid. Recipes and cure data are given in the following table.

| | 1 | 2 | 3 | 4 | 5 |
|---|---|---|---|---|---|
| Carboxyl Polymer A | 100 | 100 | 100 | 100 | — |
| Carboxyl Polymer G | — | — | — | — | 100 |
| Halogen Polymer E | 7 | 10 | 10 | 8 | 7 |
| N550 Carbon Black | 55 | 55 | 55 | 65 | 60 |
| N881 Carbon Black | 20 | 20 | 20 | — | 20 |
| Potassium Stearate | 2.3 | 2.1 | 2.0 | 2.0 | 2.0 |
| Trimethyl Soya Ammonium Chloride | 2.5 | 3.0 | 2.4 | 2.5 | 2.5 |
| NBC | — | 0.1 | 0.1 | 0.1 | 0.1 |
| Press Cure | | | | | |
| Time, Minutes | 10 | 35 | 35 | 8 | 8 |
| Temperature, °F. | 350 | 320 | 320 | 350 | 350 |
| Tensile, psi | — | 980 | 610 | — | — |

-continued

|  | 1 | 2 | 3 | 4 | 5 |
|---|---|---|---|---|---|
| Elongation, percent | — | 800 | 980 | — | — |
| Hardness, Durometer A | — | 67 | 68 | — | — |
| Post Cure | | | | | |
| Time, Hours | 8 | 20 | 20 | 8 | 8 |
| Temperature, °F. | 350 | 320 | 320 | 350 | 350 |
| Tensile, psi | 1350 | 1730 | 1980 | 1450 | 1100 |
| Elongation, percent | 180 | 280 | 310 | 220 | 110 |
| Hardness, Durometer A | 77 | 78 | 79 | 73 | 70 |
| Compression Set (70 hrs. at 300°F.) | | | | | |
| Press Cure, percent | — | 98 | 100 | — | — |
| Post Cure, percent | 23 | 43 | 41 | 35 | 25 |
| Aged ASTM No. 3 Oil (3 days at 300°F.) | | | | | |
| Tensile, psi | 1200 | 1650 | 1780 | — | — |
| Elongation, percent | 170 | 270 | 290 | — | — |
| Hardness, Durometer A | 64 | 68 | 68 | — | — |
| Volume Swell, percent | 23 | 14 | 15 | — | — |
| Aged at 350°F. in Air | | | | | |
| Days | 7 | 5 | 5 | 7 | 7 |
| Tensile, psi | 840 | 1680 | 1350 | 1120 | 600 |
| Elongation, percent | 170 | 260 | 290 | 210 | 10 |
| Hardness, Durometer A | 81 | 85 | 85 | 84 | 94 |
| Gehman Freeze, °C. | — | −17 | −17 | −17 | −32 |

EXAMPLE VI

Examples IV and V were repeated except for the use of a carboxyl-containing diene rubber in place of a carboxyl-containing acrylate rubber.

Recipes and gel times are given as follows:

|  | 1 | 2 | 3 |
|---|---|---|---|
| Carboxyl Polymer H | 100 | 100 | 100 |
| Halogen Polymer F | 10 | 5 | 7 |

|  | 1 | 2 | 3 | 4 | 5 | 6 | 7 | 8 | 9 |
|---|---|---|---|---|---|---|---|---|---|
| Carboxyl Polymer D | 100 | 100 | 100 | 100 | 100 | 100 | 100 | 100 | 100 |
| Halogen Polymer E | 15 | 15 | 10 | 10 | 8 | 5 | 5 | 5 | 5 |
| N550 Black | 40 | 40 | 40 | 40 | 40 | 40 | 40 | — | — |
| Acrawax C | 2 | 2 | — | 2 | 2 | 2 | 2 | — | — |
| NBC | 0.2 | 0.2 | — | — | — | — | — | — | — |
| Stalite S | 1 | 1 | — | — | — | — | — | — | — |
| Sodium Stearate | — | — | — | — | 2.5 | 2.5 | — | — | 2.0 |
| Potassium Stearate | 2.0 | 3.7 | 2.8 | 2.0 | — | — | 1.0 | 1.0 | — |
| Trimethyl Soya Ammonium Chloride | 2.5 | 2.5 | — | 1.25 | 2.0 | 2.0 | — | — | — |
| Trimethyl Soya Ammonium Neodecanoate | — | — | — | — | — | — | 2.5 | 3.0 | — |
| Trimethyl Soya Ammonium p-toluene sulfonate | — | — | — | — | — | — | — | — | 2.0 |
| Dodecyl Pyridinium Bromide | — | — | 1.0 | — | — | — | — | — | — |
| Press Cure | | | | | | | | | |
| Time, Minutes | 50 | 50 | 40 | 50 | 40 | 40 | 40 | 40 | 40 |
| Temperature, °F. | 338 | 338 | 350 | 338 | 338 | 338 | 338 | 338 | 338 |
| Tensile, psi | 1300 | 1650 | 860 | 1300 | 2150 | 1550 | 2000 | 1130 | 1730 |
| Elongation, percent | 740 | 640 | 1030 | 740 | 550 | 680 | 500 | 560 | 570 |
| Hardness, Durometer A | 58 | 58 | 55 | 58 | 62 | 59 | 59 | 59 | 62 |
| Air Aged, 5 days at 257°F. | | | | | | | | | |
| Tensile, psi | 1740 | 1250 | — | — | — | — | — | — | — |
| Elongation, percent | 270 | 210 | — | — | — | — | — | — | — |
| Hardness, Durometer A | 65 | 65 | — | — | — | — | — | — | — |

EXAMPLE VII

A liquid carboxyl-containing acrylate polymer was placed in a vessel with a halogen-containing polymeric resin and curatives. The vessel was placed in an oil bath which was at 150°C. The mix was stirred until it gelled into a solid mass. A short gel time indicates fast cure.

The liquid carboxyl-containing acrylate polymers (Carboxyl Polymer H) is comprised of interpolymerized units of 48.5% by weight ethyl acrylate, 48.5% by weight of n-butyl acrylate, and 3% by weight of methacrylic acid and has a bulk viscosity of 546,000 centipoise measured at 53°C. using a Brookfield LVT Viscometer at 0.6 rpm with spindle No. 4. The halogen-containing polymer (Halogen Polymer F) is a brominated phenol-formaldehyde resin having a bromine content of about 3.7% by weight and a methylol content of about 11% by weight.

| | 1 | 2 | 3 |
|---|---|---|---|
| Trimethyl Soya Ammonium Neodecanoate | 2.0 | 2.0 | 2.0 |
| Sodium Stearate | 4.0 | 5.0 | — |
| Barium Salt of Naphthenic Acid | — | — | 4.0 |
| Gel Time, Minutes at 150°C. | 56 | 111 | 20 |

We claim:

1. A vulcanizable polymer blend comprising (1) from about 1 part to about 99 parts by weight of a halogen-containing polymer per 100 parts by weight of the halogen-containing and carboxyl-containing polymers, (2) from about 1 part to about 99 parts by weight of a carboxyl-containing polymer per 100 parts by weight of the halogen-containing and carboxyl-containing polymers, and (3) a cure system consisting essentially of (A) from about 0.5 part to about 20 parts by weight of a metal oxy compound selected from the group consisting of (a) a metal salt of an organic acid and (b) a non-alkali metal oxide, hydroxide, or carbonate, and (B) from about 0.1 part to about 10 parts by weight of either a quaternary ammonium salt or a monofunctional tertiary amine, said parts by weight of the cure system based on 100 parts by weight of the halogen-containing and carboxyl-containing polymers.

2. A composition of claim 1 where in the cure system the metal oxy compound is a non-alkali metal oxide, hydroxide, or carbonate wherein the non-alkali metal is selected from the group consisting of barium, lead, calcium, magnesium, zinc, copper, aluminum, and cadmium.

3. A composition of claim 1 where in the cure system the metal oxy compound is a metal salt of an organic acid wherein the organic acid is selected from the group consisting of (i) metal salts of monocarboxylic acids containing 2 to about 24 carbon atoms in the molecule where the metal is sodium, potassium, barium, magnesium, lead, zinc, copper or cadmium, (ii) organophosphoric acids of the structure

wherein M is an alkali metal; $y = 1$ or 2, $z = 1$ or 2, and $y + z = 3$; and R is selected from the group consisting of an alkyl radical containing 1 to 24 carbon atoms, an aryl radical containing 6 to 24 carbon atoms, and an alkylphenoxy poly(ethyleneoxy) ethyl group, and (iii) an organosulfonic acid of the structure

wherein M, $y$, $z$, and R are defined as above.

4. A composition of claim 3 wherein the metal salt of an organic acid is a sodium or potassium salt of an aliphatic or aromatic monocarboxylic acid containing 6 to about 20 carbon atoms in the molecule.

5. A composition of claim 3 where in the cure system (B) is a monofunctional tertiary aliphatic, heterocyclic, or cyclic methylene amine.

6. A composition of claim 5 wherein the monofunctional tertiary amine is a tertiary aliphatic amine containing 1 to about 18 carbon atoms in the aliphatic groups where at least one aliphatic group is a methyl or ethyl radical.

7. A composition of claim 6 wherein the tertiary monofunctional amine is employed in the form of an aminimide or an amine/acid salt.

8. A composition of claim 3 where in the cure system (B) is a quaternary ammonium salt of the structure

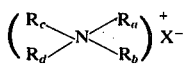

wherein $R_a$, $R_b$, $R_c$ and $R_d$ are hydrocarbon radicals containing 1 to about 18 carbon atoms selected from the group consisting of alkyl, aryl, alkaryl, and aralkyl radicals, or wherein two or three of the $R_a$, $R_b$, $R_c$ and $R_d$ radicals form with the nitrogen atom a heterocyclic structure containing 3 to 8 atoms selected from the group consisting of C, N, O and S where at least two atoms are C; and X is an anion selected from the group consisting of Cl$^-$, Br$^-$, I$^-$, OH$^-$, NO$_3^-$, HSO$_4^-$, NaSO$_4^-$, H$_2$PO$_4^-$, NaHPO$_4^-$, RCOO$^-$, ROSO$_3^-$, RSO$_3^-$, H$_2$BO$_3^-$, and ROPO$_3$H$^-$, where R is an aliphatic, alkyl or alkaryl radical containing 1 to 18 carbon atoms.

9. A composition of claim 4 wherein the quaternary ammonium salt is selected from the group consisting of trimethyl soya ammonium chloride, trimethyl soya ammonium neodecanoate, trimethyl soya ammonium stearate, trimethyl soya ammonium p-toluene sulfonic acid, cetyl trimethyl ammonium bromide, and dodecyl pyridinium bromide.

10. A composition of claim 9 wherein the halogen-containing polymer is selected from the group consisting of epihalohydrin homopolymers, epihalohydrin copolymers, chlorobutadiene homopolymers, and (acrylate/halogen-bearing vinylidene monomer) polymers.

11. A composition of claim 10 wherein the carboxyl-containing polymer is selected from the group consisting of (acrylate/carboxyl-containing monomer) polymers and (diene/vinyl nitrile/carboxyl-containing monomer) polymers.

12. A composition of claim 11 wherein the cure system consists essentially of sodium stearate and trimethyl soya ammonium chloride or trimethyl soya ammonium neodecanoate.

13. A composition of claim 11 wherein the cure system consists essentially of sodium stearate and trimethylamine.

14. A composition of claim 11 wherein the cure system consists essentially of potassium stearate and trimethyl soya ammonium neodecanoate or trimethyl soya ammonium chloride.

15. A composition of claim 12 comprising a polymer blend of an epichlorohydrin homopolymer and an ethyl acrylate/methacrylic acid copolymer and a cure system consisting essentially of sodium stearate and trimethyl soya ammonium chloride.

16. A composition of claim 14 comprising a polymer blend of epichlorohydrin homopolymer and ethyl acrylate/methacrylic acid copolymer and a cure system consisting essentially of potassium stearate and trimethyl soya ammonium neodecanoate.

17. A composition of claim 12 comprising a terpolymer of interpolymerized units of butadiene, acrylonitrile and methacrylic acid, an epichlorohydrin homopolymer, and a cure system consisting essentially of sodium stearate and trimethyl soya ammonium chloride.

18. A composition of claim 12 comprising a copolymer of interpolymerized units of ethyl acrylate and methacrylic acid, a polychloroprene homopolymer, and a cure system consisting essentially of sodium stearate and trimethyl soya ammonium chloride.

19. A composition of claim 12 comprising a copolymer of interpolymerized units of ethyl acrylate and methacrylic acid, a tetrapolymer of interpolymerized units of n-butyl acrylate, methoxyethyl acrylate, ethyl acrylate, and vinyl benzyl chloride, and a cure system consisting essentially of sodium stearate and trimethyl soya ammonium chloride.

20. A composition of claim 14 comprising a terpolymer of interpolymerized units of butadiene, acrylonitrile, and methacrylic acid, a copolymer of interpolymerized units of epichlorohydrin and ethylene oxide, and a cure system consisting essentially of potassium stearate and trimethyl soya ammonium chloride.

21. A composition of claim 12 comprising a terpolymer of interpolymerized units of n-butyl acrylate, methoxyethyl acrylate, and methacrylic acid, a copolymer of interpolymerized units of epichlorohydrin and ethylene oxide, and a cure system consisting essentially of sodium and potassium stearate and trimethyl soya ammonium chloride.

22. A composition of claim 7 comprising a copolymer of interpolymerized units of ethyl acrylate and methacrylic acid, a tetrapolymer of interpolymerized units of n-butyl acrylate, methoxyethyl acrylate, ethyl acrylate, and vinyl benzyl chloride, and a cure system consisting essentially of sodium stearate and a trimethylamine/hydrochloric acid salt or bis(trimethylamine)sebacimide.

* * * * *